US012663631B2

(12) United States Patent
Yan et al.

(10) Patent No.: US 12,663,631 B2
(45) Date of Patent: Jun. 23, 2026

(54) SWAPPABLE DETECTOR MODULE FOR SPECTROSCOPE SYSTEMS

(71) Applicant: Thermo Electron Scientific Instruments LLC, Madison, WI (US)

(72) Inventors: Min Yan, Verona, WI (US); William Bayer, Black Earth, WI (US); William Keefe, Oconomowoc, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 297 days.

(21) Appl. No.: 18/340,273

(22) Filed: Jun. 23, 2023

(65) Prior Publication Data

US 2024/0427133 A1      Dec. 26, 2024

(51) Int. Cl.
*G02B 21/26* (2006.01)
*G02B 21/28* (2006.01)

(52) U.S. Cl.
CPC ............. *G02B 21/26* (2013.01); *G02B 21/28* (2013.01)

(58) Field of Classification Search
None
See application file for complete search history.

(56) References Cited

U.S. PATENT DOCUMENTS 4,753,525 A * 6/1988 Gaul ................... G02B 21/088
                                                 359/388
7,345,814 B2   3/2008 Yoneyama et al.

| 7,440,095 | B2 | 10/2008 | Deck |
| 8,576,483 | B2 | 11/2013 | Tanabe et al. |
| 10,846,882 | B2 | 11/2020 | Deck et al. |
| 11,356,593 | B2 | 6/2022 | Zheng |
| 2018/0307005 | A1 | 10/2018 | Price et al. |
| 2019/0302440 | A1 | 10/2019 | Stoppe et al. |
| 2022/0292854 | A1 * | 9/2022 | Pang ...................... G06V 10/26 |

FOREIGN PATENT DOCUMENTS

EP        4198604 A1      6/2023

OTHER PUBLICATIONS

Flasseur, O., et al. "Self-calibration for lensless color microscopy." Applied optics 56.13 (2017): F189-F199.
Liao, Y. et al. "An auto-focus method of microscope for the surface structure of transparent materials under transmission illumination." Sensors 21.7 (2021): 2487.

* cited by examiner

*Primary Examiner* — Jennifer D. Carruth
(74) *Attorney, Agent, or Firm* — Michael Best & Friedrich LLP

(57) ABSTRACT

A removably insertable detector module for a spectroscope. An example microscope system includes a microscope plate, a plurality of posts fix-mounted to the microscope plate, and a detector module removably mounted to the microscope plate. The posts align the detector module with respect to the microscope plate. The detector module includes a detector base plate, a detector fix-mounted on the detector base plate, and an optical element fix-mounted on the detector base plate. The optical element is configured to receive a light and direct the light to the detector.

21 Claims, 12 Drawing Sheets

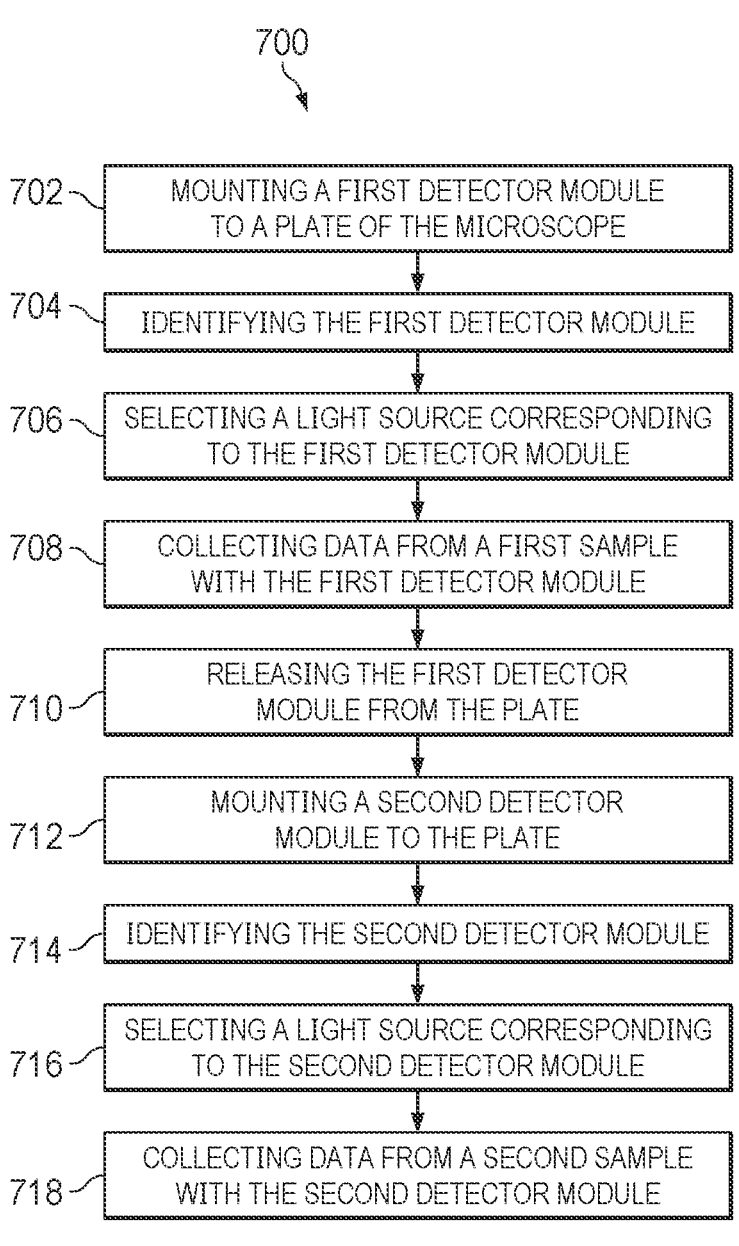

700

702 — MOUNTING A FIRST DETECTOR MODULE TO A PLATE OF THE MICROSCOPE

704 — IDENTIFYING THE FIRST DETECTOR MODULE

706 — SELECTING A LIGHT SOURCE CORRESPONDING TO THE FIRST DETECTOR MODULE

708 — COLLECTING DATA FROM A FIRST SAMPLE WITH THE FIRST DETECTOR MODULE

710 — RELEASING THE FIRST DETECTOR MODULE FROM THE PLATE

712 — MOUNTING A SECOND DETECTOR MODULE TO THE PLATE

714 — IDENTIFYING THE SECOND DETECTOR MODULE

716 — SELECTING A LIGHT SOURCE CORRESPONDING TO THE SECOND DETECTOR MODULE

718 — COLLECTING DATA FROM A SECOND SAMPLE WITH THE SECOND DETECTOR MODULE

FIG. 7

SWAPPABLE DETECTOR MODULE FOR SPECTROSCOPE SYSTEMS

FIELD

Embodiments described herein relate to spectroscopes, such as, for example, infra-red (IR) microscopy, and, more specifically, to a detector module removably insertable into spectroscopes and spectroscopic imaging microscopes.

SUMMARY

One example provides a microscope system including a microscope plate, a plurality of posts fix-mounted to the microscope plate, and a detector module removably mounted to the microscope plate. The posts align the detector module with respect to the microscope plate. The detector module includes a detector base plate, a detector fix-mounted on the detector base plate, and an optical element fix-mounted on the detector base plate. The optical element is configured to receive a light and direct the light to the detector.

Another example includes a swappable detector module for a microscope system. The detector module includes a detector housing including a top plate, a bottom plate, and a side wall extending from the bottom plate to the top plate. The side wall includes an opening for light to enter the detector module. The detector module includes a detector fix-mounted to the bottom plate and situated within the detector housing, an optical element fix-mounted on the bottom plate and situated within the detector housing, and at least one latch coupled to the top plate for locking the detector module to a microscope. The optical element is configured to receive the light entering the detector module and direct the light to the detector.

Other aspects will become apparent by consideration of the detailed description and accompanying drawings.

BRIEF DESCRIPTION OF THE DRAWINGS

Illustrative embodiments of the invention will hereafter be described with reference to the accompanying drawings, wherein like numerals denote like elements.

FIG. 7 depicts a method for replacing the detector module of FIG. 3A in accordance with an illustrative embodiment.

DETAILED DESCRIPTION

Figure 1A:
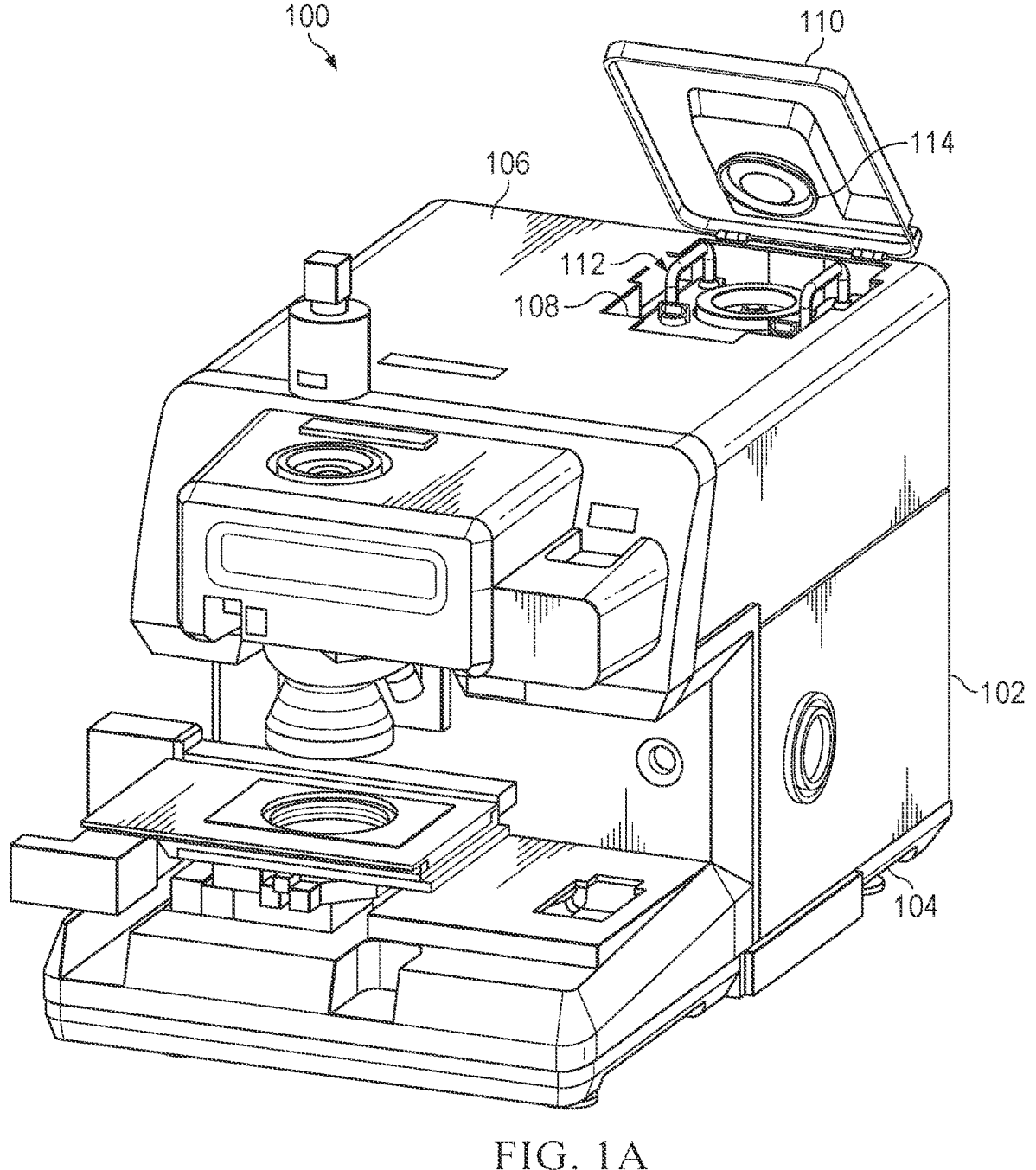
FIGS. 1A-1B depict a spectrometer in accordance with an illustrative embodiment.

Fourier transform infrared (FTIR) spectroscopes (for example, spectrometers, microscopes, and the like) are utilized to perform accurate and efficient identification of the chemical composition of a sample. Such spectroscopes typically incorporate an interferometer such as a Michelson interferometer that has a beamsplitter and a moving mirror. The interferometer modulates the beam from a source to provide an output beam in which the intensity of the radiation at various wavelengths is varied. The light may be in the near ultraviolet (UV), visible (Vis), near-infrared (NIR), mid-infrared (MIR), and/or far-infrared (FIR) wavelength ranges, and thus, is not limited to the infrared spectral region. The output beam is focused and passed through or reflected from a sample, after which the beam is collected and focused onto a detector. The detector provides a time varying output signal that contains information concerning the wavelengths of absorbance or reflectance of the sample. For example, the intensity of the output light at the one or more wavelengths is compared to the intensity of the input light at the one or more wavelengths to determine characteristics of the sample, such as the absorbance, the transmittance, the fluorescence, the reflectance, etc. Fourier analysis is performed on the output signal data to yield the measured characteristics that provide information about the identity of the components within the sample, their relative concentrations, and possibly other features of the sample.

As the light received by the detector has a diameter less than 0.25 mm, placement of the detector within the spectroscope must be precise for accurate measurements. Tradiitional detectors require a specialized technician to replace the detector, causing a delay in collecting data when a different detector is desired and the potential for manual error and inefficient use of resources (e.g., if an experiment needs to be repeated due to an improperly installed detector). Accordingly, there is a need for an easily replaceable (or swappable) detector module for spectroscopes.

Embodiments described herein provide for a removably insertable detector module for a microscope or spectroscope with alignment features to assist in replacing the detector. For example, a removably mounted detector module is inserted into the microscope for receiving a light beam that has interfaced with a sample for analysis. The detector module may include an detector base plate, a detector fix-mounted on the detector base plate, and at least an optical element configured to receive a light from the sample and direct the light to the detector. The optical element may focus the light to the detector. The optical element may be a mirror. In one example, the mirror is a parabolic mirror for focusing the light on the detection elements of the detector. The optical element may be pre-aligned relative to the detector and fix-mounted on the detector base plate. The optical element may be further aligned with other optical elements arranged outside of the detector module, which deliver light toward the detector module. In this way, an operator or user of the microscope/spectrograph, instead of the service people, may swap the detector module without re-aligning the detector.

To assist an operator in ensuring that the detector module automatically aligns within the microscope, a plurality of posts are fix-mounted to a microscope plate of the microscope and extend perpendicularly from the microscope plate. The microscope plate is fix-mounted to the microscope's housing. In one example, the microscope plate is the microscope's base. In another example, the microscope plate is positioned parallel to the microscope's base. In yet another example, the microscope plate is perpendicular to the microscope's base. The plurality of posts may align the detector module with the microscope plate by guiding the detector module towards the targeted position of the microscope plate while the operator is inserting the detector module into the microscope. In some embodiments, one or more posts are arranged to surround the detector module when the detector module is mounted to the microscope. In other embodiments, one or more of the posts may penetrate into the detector module through one or more holes in the detector base plate. In some embodiments, when the detector module is mounted, some posts are outside of the detector module and some posts are inserted into or through the detector module.

To further align the detector module with respect to the microscope plate, the detector module may include at least one pin, and preferably two pins, extending from a bottom of the detector module (e.g., detector based plate) and configured to interface with a recess in the base of the microscope plate. The pin may also assist in aligning one or more electrical terminals that electrically connect the detector module and the microscope.

The detector module may include a detector top plate and one or more latches coupled to the detector top plate. In some examples, the detector top plate may include recessed regions around the edge for receiving the posts when mounting the detector module to the microscope. In some examples, the detector top plate may include one or more holes for receiving the posts. The one or more latches can engage with the posts to secure the detector module relative to the microscope plate. In some examples, the latch can engage with a gap of the post, and apply a vertical force to the microscope plate to push the detector module against the microscope plate. As such, the detector module is secured in the axis normal to the microscope plate. Handles or other types of grips may be provided on top of the detector module (e.g., on the detector top plate) to assist the operator in installing the detector module.

The detector module may further include a side wall surrounding at least a portion of the detector and the optical element. The side wall extends from the top plate to the detector base plate. The side wall may include recesses for receiving the posts, to further align the detector module with respect to the posts.

The detector module may include an opening for receiving cooling agents for the detector. The microscope may have a module opening for replacing the detector module. The microscope may have a fill port for receiving the cooling agent. The fill port may be a part of the module opening. As such, cooling agents may be conveniently added to the detector module via the fill port and the opening of the detector module while the detector module is mounted with the microscope.

Herein, when two parts (e.g., any mechanical or optical component) are fix-mounted, the relative positions among the parts cannot be changed, or the parts are not moveable relative to each other. The two parts may be fix-mounted via direct or indirect connection. A user of the spectroscope cannot adjust the relative position of the fix-mounted parts. However, a user may detach or attach the removable/swappable mounted parts during the normal operation of the spectroscope.

The microscope can be configured to automatically recognize the detector type via electrical terminals of the detector module once the detector module is mounted and locked to the microscope plate. The microscope can automatically set data acquisition parameters based on the recognized detector. As such, the same sample may be imaged with different detectors. The operator can easily and reliably swap the detector module while the microscope is powered on. This may significantly reduce the microscope's downtime.

In an illustrative embodiment, a microscope system is provided. The microscope system includes a microscope plate, a plurality of posts fix-mounted to the microscope plate, and a detector module removably mounted to the microscope plate. The detector module is surrounded by the plurality of posts when the detector module is mounted to the microscope plate. The detector module includes a detector base plate, a detector fix-mounted on the detector base plate, and an optical element fix-mounted on the detector base plate. The optical element is configured to receive a collimated light beam and focus the light on the detector.

In another illustrative embodiment, a swappable detector module for a microscope system is provided. The detector module includes an detector housing including a top plate, a bottom plate, and a side wall extending from the bottom plate to the top plate. The side wall includes an opening for light to enter the detector module. The detector module includes a detector fix-mounted to the bottom plate and situated within the detector housing, and an optical element fix-mounted on the bottom plate and situated within the detector housing. The optical element is configured to receive the light entering the detector module and direct the light to the detector. The detector module also includes at least one latch coupled to the top plate for locking the detector module to a microscope.

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and data exchanges may be performed using any known means including direct connections, wireless connections, and the like.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein. For example, "controller" described in the specification may include one or more processors, one or more memory modules including non-transitory computer-readable medium, one or more input/output interfaces, and various connections (for example, a system bus) connecting the components.

As understood by a person of skill in the art, Fourier transform infrared (FTIR) spectroscopy is a measurement technique where, instead of recording the amount of energy absorbed in each individual spectral range, the energy across the entire spectra is collected by a single detector. The light source emits broadband infrared energy that is directed into an interferometer, such as a Michelson interferometer, which splits the light. The light that comes out of the interferometer is directed into a sample compartment of a sample analysis device. The light interacts with the sample and is either transmitted through or reflected off of the surface of the sample depending on the type of analysis performed by the sample analysis device. After exiting the sample compartment, the light reaches a detector and is measured to produce a sample analysis signal. Using the Fourier transform, the sample analysis signal is transformed from the displacement of the mirror to the wavenumbers to obtain spectral information about the sample. Typically, a FTIR spectrometer includes a laser for internal calibration of the interferometer.

Figure 1B:
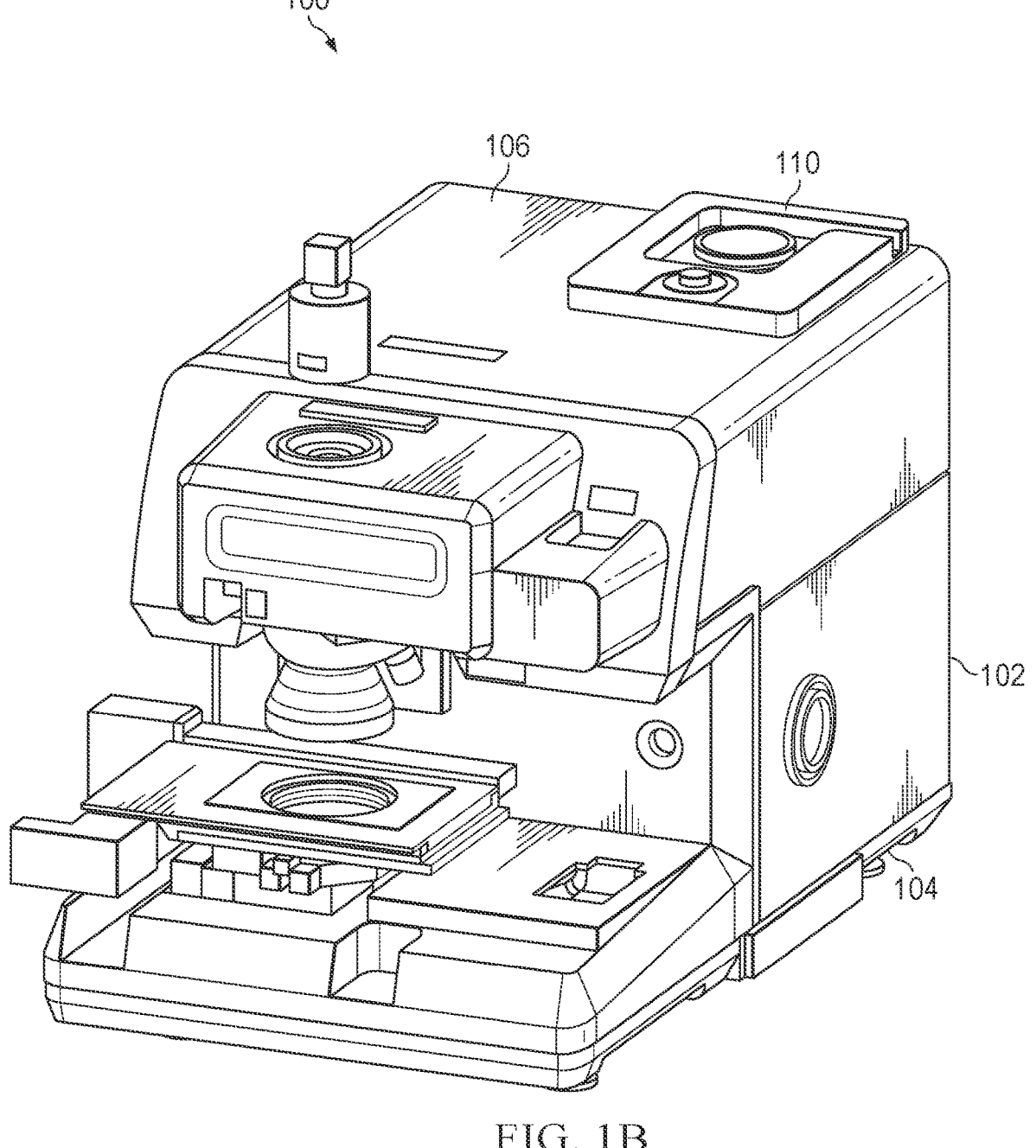

Turning to FIGS. 1A-1B, FIGS. 1A-1B illustrates an example spectrometer 100. The spectrometer includes an instrument housing 102 coupled to a microscope base 104. A plurality of electrical and optical components may be connected to the microscope base 104, to a secondary plate (e.g., microscope plate 404 shown in FIG. 4) within the instrument housing 102, or a combination thereof. The instrument housing 102 includes a top portion 106 in which an accessory opening 108 is formed. A cover 110 is coupled to the top portion 106 (for example, via one or more hinges) to optionally seal the accessory opening 108. In the example of FIG. 1A, the cover 110 is open. In the example of FIG. 1B, the cover 110 is closed. The cover 110 may be removably coupled to the top portion 106 or may be secured to the top portion 106, such as via a threaded coupling, a pressure or friction fit coupling, or the like. The accessory opening 108 may receive a detector module 112, as described below in more detail. In some instances, the cover 110 includes a fill port 114 aligned with a detector top opening 328 of the detector module 112 (see FIGS. 3A-3D) for adding cooling agents to the detector module.

Figure 2:
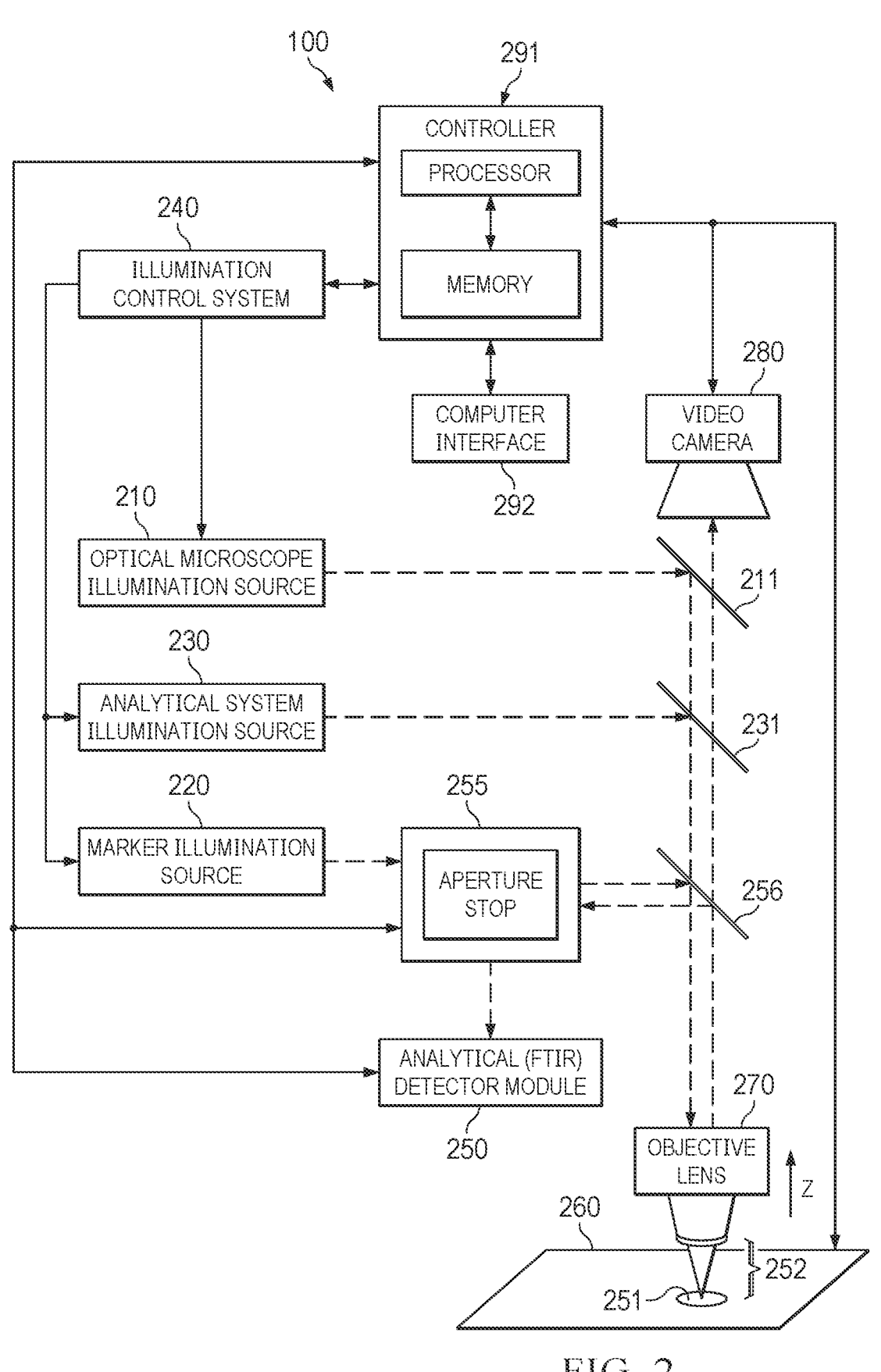
FIG. 2 depicts a block diagram of the spectrometer of FIGS. 1A-1B in accordance with an illustrative embodiment.
Figure 3A:
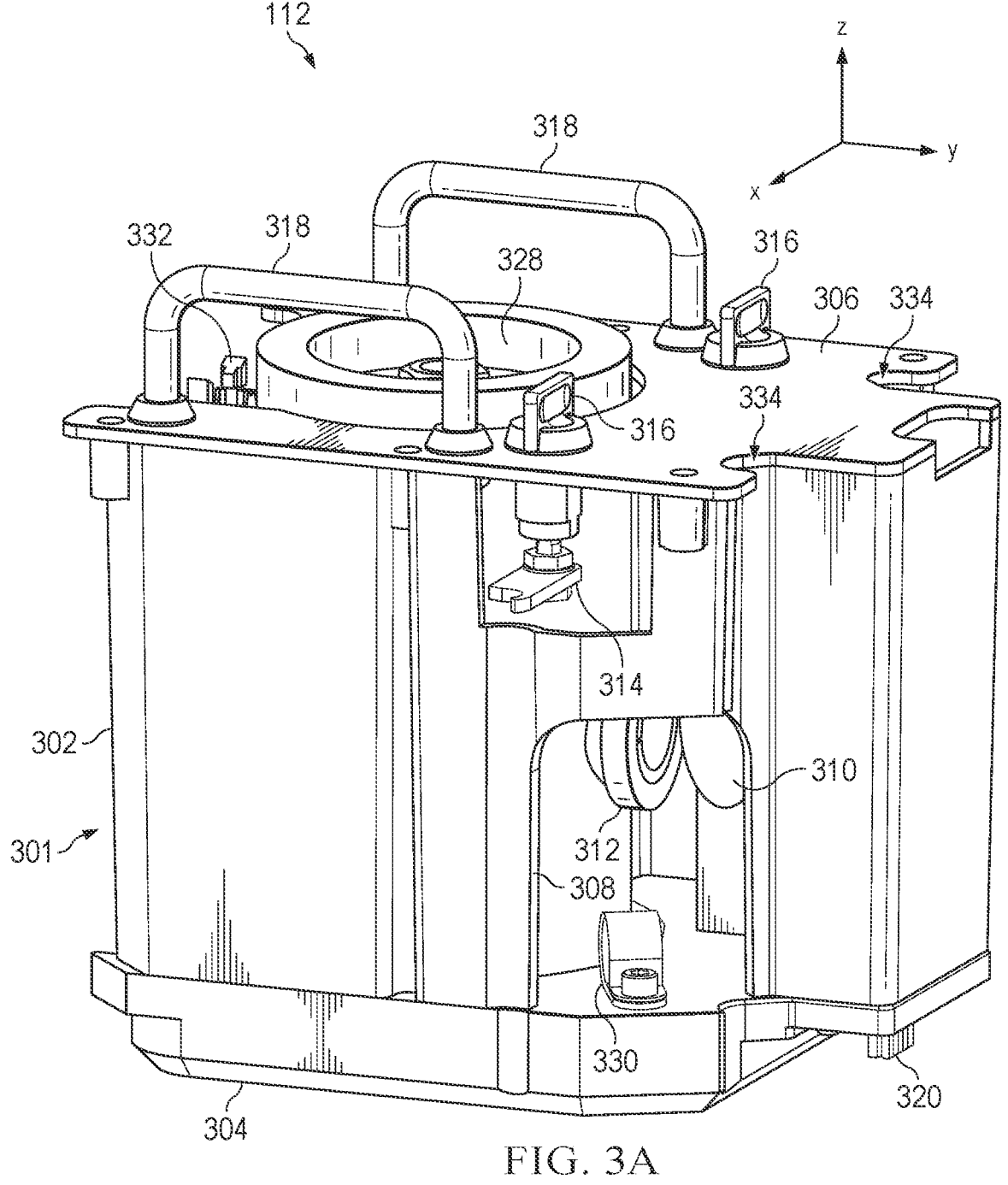
FIG. 3A depicts a perspective view of a detector module in accordance with an illustrative embodiment.
Figure 3B:
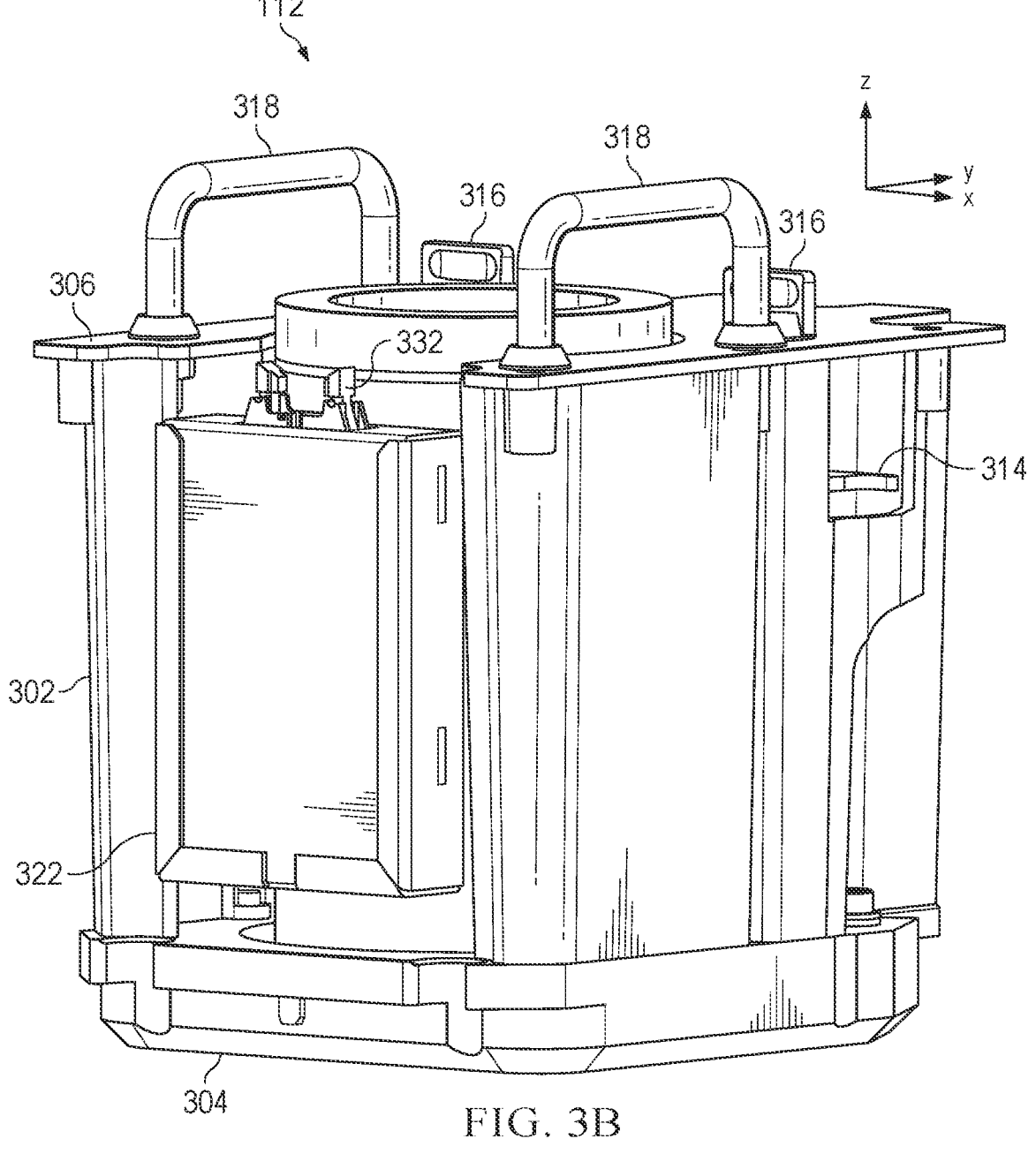
FIG. 3B depicts another perspective view of the detector module of FIG. 3A.
Figure 3C:
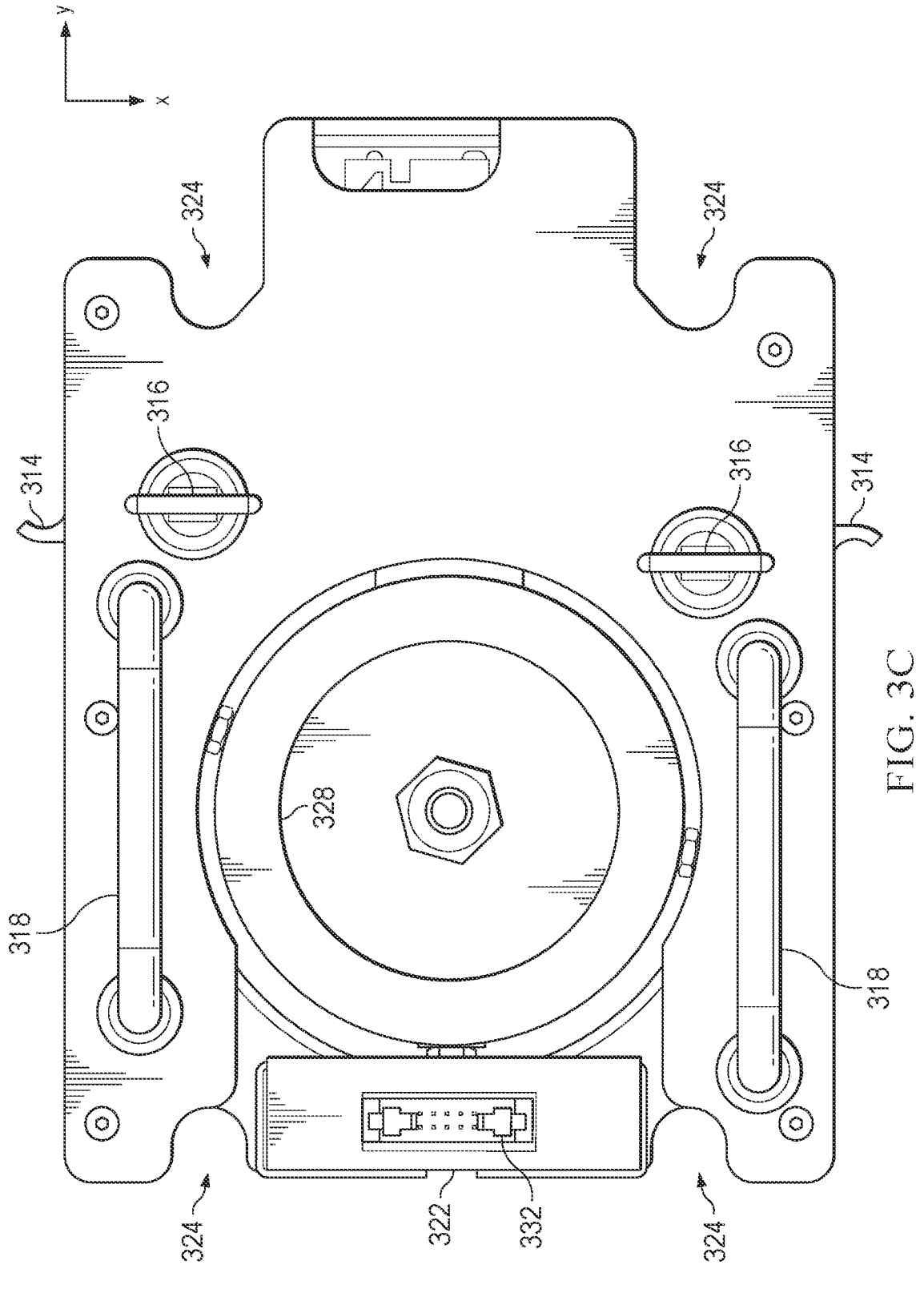
FIG. 3C depicts a top view of the detector module of FIG. 3A.
Figure 3D:
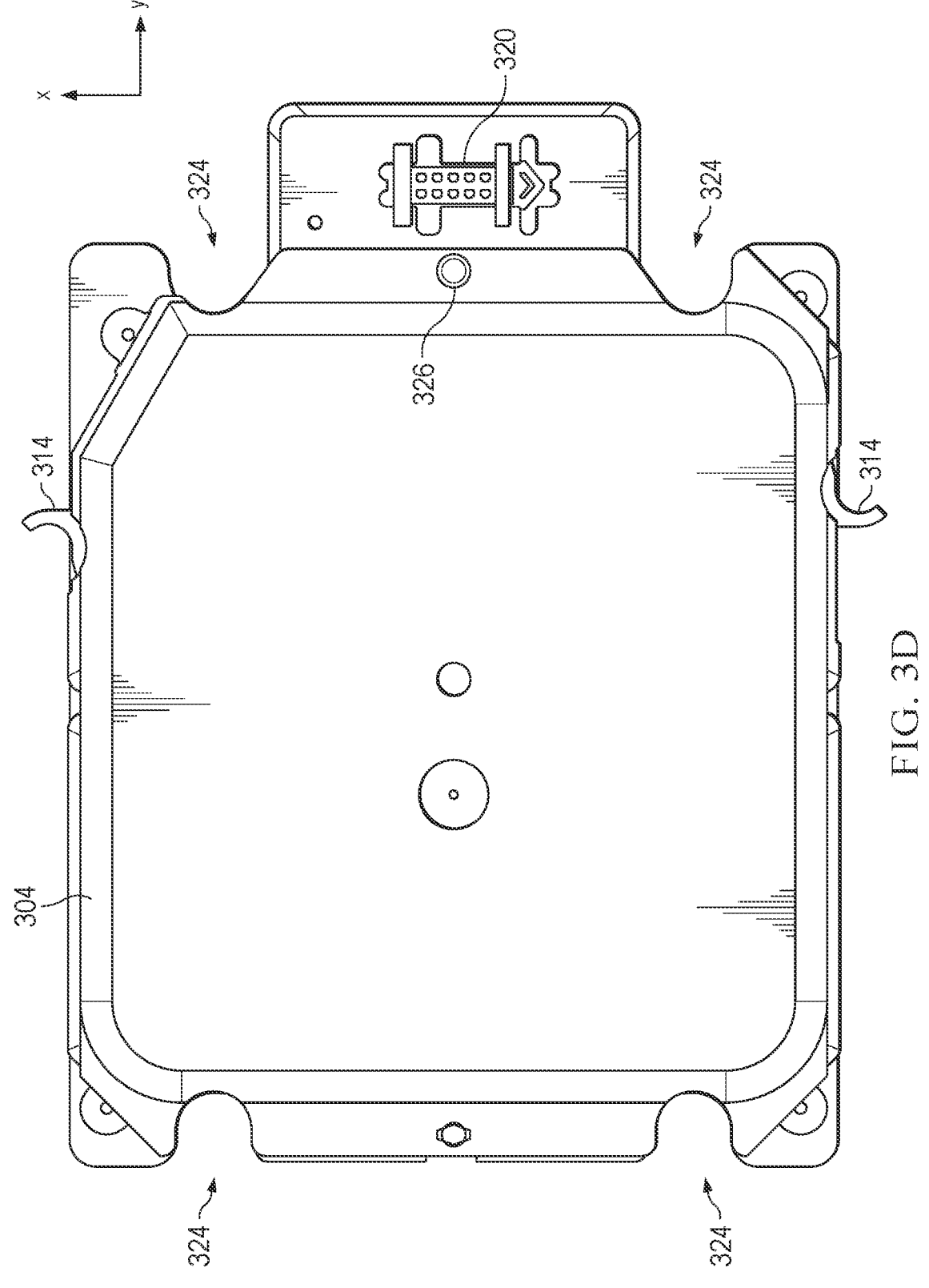
FIG. 3D depicts a bottom view of the detector module of FIG. 3A.

FIG. 2 illustrates an example of the spectrometer 100 including an optical microscope and an analytical system. In this example, the optical microscope includes an optical microscope illumination source 210, a beam splitter 211, and a camera 280. Light (such as visible light) generated from the optical microscope illumination source is directed toward an objective lens 270 after being reflected by the beam splitter 211. The objective lens 270 directs the light toward a sample 251 positioned on a sample stage 260. A portion of light reflected from the sample 251 passes through the objective lens 270 and is received by the camera 280. The light received by the camera 280 may also pass one or more beam splitters (for example, beam splitters 211, 256, 231). The camera 280 may be a video camera or may be any other detector suitable for acquiring an image of the sample 251. The sample image allows for the visualization of the sample 251. For example, features or objects on the surface of the sample 251 can be visualized in an image of the sample.

The analytical system includes an analytical illumination source 230, a beam splitter 231, an aperture stop 255, and a detector module 250 (for example, an analytical [FTIR] detector module). The detector module 250 may be, for example, the same as the detector module 112 or includes components of the detector module 112. Light (such as light in NIR-IR wavelength range) generated from the analytical illumination source 230 is directed sequentially to the beam splitter 231, the objective lens 270, and the sample 251. Light reflected back from the sample 251 sequentially passes the objective lens 270, the beam splitter 256, the aperture stop 255, and reaches the detector module 250. The aperture stop 255 includes an adjustable aperture, wherein the size of the aperture can be adjusted by a controller, such as the illumination control system 240 or the controller 291. Based on the spectral data received by the detector module 250, sample composition (such as the molecular composition) can be determined. The aperture of the aperture stop 255 limits the sample area from which the reflected light can reach the detector module 250. In this way, the aperture stop 255 determines the size of the sample area that is analyzed by the analytical system. In other words, the aperture determines the spatial resolution of the analytical system.

The spectrometer 100 further includes a marker illumination source 220. Light generated from the marker illumination source 220 reaches the sample 251 after sequentially passing the aperture stop 255, the beam splitter 256, and the objective lens 270. Part of the light reflected from the sample 251 is collected by the camera 280 after passing through beam splitters 256, 231, and 211. The light generated from the marker illumination source 220 has a narrower bandwidth compared to the light generated from the optical microscope illumination source 210. In one example, the wavelength bandwidth of the light generated by the marker illumination source 220 is less than 100 nm. In another instance, the wavelength bandwidth of the light for acquiring the aperture marker image is less than 50 nm or less than 30 nm. In another example, the light generated by the marker illumination source 220 is blue light. In yet another example, the wavelength of the light for acquiring the aperture marker image is between 440 nm and 480 nm.

Using a short wavelength in the visible wavelength range can increase the resolution of the aperture marker image so that the accuracy of the first part of the auto-focusing procedure is increased. Using a narrow wavelength rage (such as the blue light) may advantageously reduce the effects of external light sources on acquiring the aperture marker images. When the sample 251 is only illuminated by the marker illumination source 220, the image acquired by the camera 280 includes a high intensity region corresponding to the portion of the sample surface illuminated by the light passing through the aperture. The high intensity region in the image is herein referred to as an aperture marker. The shape and size of the aperture marker in the image depend on the shape and size of the aperture of the aperture stop 255, the optical configuration of the spectrometer 100, and the position of the sample 251 with respect to the objective lens 270. The aperture marker in the acquired image can be used to indicate a region of the sample that is analyzed by the analytical system. As such, when both the optical microscope illumination source 210 and the marker illumination source 220 are turned on, the aperture marker can be used to select a region of the sample for the analytical acquisition.

The optical microscope illumination source 210, the analytical illumination source 230, and the marker illumination source 220 may have different optical characteristics (e.g., different wavelengths, intensity, etc.) due to their use by the different parts of the spectrometer 100. Because light from the marker illumination source 220 is eventually projected on the sample 251 through the aperture stop 255, less light might be projected onto the sample 251 by the marker illumination source 220 than with the optical microscope illumination source 210.

In some embodiments, the marker illumination source 220 may be a separate model from the spectrometer 100. In some embodiments, the marker illumination source 220 may be omitted. For example, the marker illumination source 220 may be realized by filtering light generated from the optical microscope illumination source 210.

The focal point of the optical microscope and analytical optical system is the same to allow for proper visualization and sample analysis. Herein, the focal point of the optical microscope and the analytical system is referred to as the focal point of the spectrometer 100. Ideally, the focal point of the spectrometer 100 should be substantially at the sample surface. Thus, the position of the sample 251 is adjusted (such as along the z-axis) by either moving the position of sample 251 or moving the optics (such as the objective lens 270) until the focal point is properly positioned. In one example, adjusting the focal point relative to the sample surface includes adjusting the distance 252 between the objective lens 270 and the sample stage 260.

The spectrometer 100 includes a controller 291, which includes a processor and a non-transitory memory for storing the computer readable instructions. By executing the instructions in the processor, the imaging system can execute the device-implemented methods disclosed herein or portions thereof. The controller 291 may send and receive information from one or more of the illumination control system 240, the camera 280, the detector module 250, the aperture stop 255, and the sample stage 260. For example, the controller 291 can communicate with the illumination control system 240 to turn on or off any of the optical microscope illumination source 210, the analytical illumination source 230, and the marker illumination source 220. The illumination control system may be a separate module from the controller 291 and may also include a processor and a memory. In some examples, the illumination control system may be a part of the controller 291. The controller 291 may adjust the size of the aperture by actuating the aperture stop 255. The controller 291 may adjust the distance between the sample stage 269 (or the sample 251) and the objective lens 270 by moving the sample stage 260. The controller 291 receives data acquired from the camera 280 and the detector module 250 to generate images or graphs based on the received data. The controller 291 may receive user inputs from computer interface 292, and display acquired information, such as images and sample composition information, via the computer interface 292. The computer interface 292 may include a display and a user input device.

FIG. 2 shows an imaging system for detecting light from the sample 251. In some embodiments, the imaging system may collect light from the sample 251 in a transmission mode, and the sample 251 is illuminated from a first side of the sample 251 and the light is collected from a second, opposite side of the sample 251.

FIGS. 3A-3D illustrate an example detector module 112 that can be inserted and removed from an opening, such as accessory opening 108 at the top of the microscope or spectrometer. The detector module 112 includes a detector housing 301 composed of a side wall 302 surrounding the detector, optical elements within the detector module 112, a detector base plate 304, and a top plate 306. The top plate 306 may have one or more recessed portions 334 around the edge for aligning with the respective posts. The side wall 302 is coupled to the detector base plate 304 and the top plate 306. The side wall 302 as illustrated has a continuous perimeter of solid walls that protect the components within the detector module 112, for example, to prevent the operator accidentally touching the components within the detector module 112. However, in other embodiments, the side wall 302 may have a non-continuous perimeter (for example, a portion of the side wall 302 is removed, leaving a gap between the detector base plate 304 and the top plate 306). The side wall 302 may include one or more recesses 324 for guiding and aligning the detector module 112 horizontally (i.e., XY plane) with respect to the a microscope plate 404 (shown in FIG. 4).

The side wall 302 includes a side opening 308 that receives light from the sample 251. For example, with reference to FIG. 2, light from the sample 251 sequentially passes the objective lens 270, the beam splitter 256, the aperture stop 255, and the side opening 308. In some embodiments, the light entering the side opening 308 is a collimated light. In other embodiments, the light entering the side opening 308 is a diverging (e.g., expanded) light or a converging light. The light entering the side opening 308 is reflected by a focusing mirror 310 (for example, an optical element) toward a detector 312 as a focused light. The focusing mirror 310 and the detector 312 are situated within the detector housing 301. In some instances, the focusing mirror 310 and the detector 312 are fix-mounted to the detector base plate 304. The focused light directed by the focusing mirror 310 onto the detector 312 may have a diameter of approximately 0.25 mm. The detector 312 may be, for example, a Mercury Cadmium Telluride (MCT) IR detector, an Indium Gallium Arsenide (InGaAs) detector, or the like. Different detectors may be used for detecting different ranges of wavelengths. Different detector accessories may be inserted into the spectrometer 100 to use different detectors and/or imaging components with the spectrometer 100. In some embodiments, the focusing mirror 310 is a parabolic mirror.

To secure the detector module 112 within the spectrometer 100, the detector module 112 may include one or more latches. In the example of FIGS. 3A-3D, the detector module 112 includes one or more latches 314, and each latch 314 connected to an associated knob 316. The latch 314 and the knob 316 are combined to form a cam lock. To operate the one or more latches 314, a user installing the detector module 112 turns an associated knob 316 in a first direction. By turning the knob 316 in the first direction, the associated latch 314 is engaged and locked to a post (such as a post 400 shown in FIG. 4) fixed to a microscope plate 404 (shown in FIG. 4). The latch 314 may be engaged to a recess or gap 402 on the post 400. By turning the knob 316, the latch 314 also exerts a force along the vertical axis (i.e., an axis along the post, Z axis) relative to the post 400. As such, the detector module 112 is pushed against the microscope plate 404 and cannot move vertically relative to the microscope plate 404 when the latch 314 is engaged. That is, the detector module 112 cannot be moved in the Z axis. By turning the knob 316 in a second direction opposite to the first direction, the detector module 112 may be disengaged and released from the microscope plate 404. When in an unlocked position, a user may remove the detector module 112 from within the spectrometer 100 by lifting it along the Z axis through the opening at the top of the spectrometer 100. In other instances, other locking mechanism may be provided. For example, the knob 316 may be replaced by a lock configured to receive a key. When the key is received and turned, the respective latch 314 turns to interface with the respective recess/gap 402. In another example, the knob 316 is replaced with, for example, a pivot knob, a lateral push-type knob, or the like. Additionally, other types of locking mechanisms that engage with a portion of the spectrometer 100 may be implemented in place of the latch 314 and knob 316 that secure the detector module 112 within the spectrometer 100.

In some instances, the detector module 112 includes one or more grips, such as for example, handles 318 that extend perpendicular to the top plate 306 to assist with installation or removal of the detector module 112. While the handles 318 are illustrated as being generally circular having an open area, the handles 318 may have different shapes, sizes, and orientations. For example, in some instances the handles 318 include, for example, a knob extending from the top plate 306, may have multiple portions for receiving one or more fingers for gripping the detector module 112, or may be handles having open areas of other shapes (e.g., circular, square, triangular, etc.). Additionally, in some instances, instead of extending from the top plate 306, the handles 318 may instead extend from opposing sides of the side wall 302. A user may hold the one or more handles 318 while aligning one or more recesses 324 (see, for example, FIG. 3C) with the one or more posts 400. In some instances, the one or more recesses 324 extend along a height of the side wall 302 to assist with guiding the detector module 112 into the spectrometer 100 while the detector module 112 is being inserted.

The detector module 112 includes a detector controller 322 configured to read an output of the detector 312. The detector controller 322 includes a processor and a non-transitory memory for storing the computer readable instructions. By executing the instructions in the processor, the detector module 112 can perform operations related to the detector 312. For example, the detector controller 322 may analyze and/or alter data received from the detector 312, may condition data before sending the data to an external controller (for example, the controller 291 of the spectrometer 100), may provide control parameters for the spectrometer 100 (for example, control parameters for the illumination control system 240), or the like. In some instances, the detector module 112 includes one or more electrical terminals 320 that, when the detector module 112 is installed, interface with a respective terminal 600 of the spectrometer 100 (shown in FIG. 6B). In the illustrated example of FIGS. 3A-3D, the one or more electrical terminals 320 extend downward from the bottom of the detector base plate 304. The detector controller 322 may communicate with the controller 291 via the one or more electrical terminals 320. For example, the detector controller 322 may automatically read information from the installed detector and set corresponding parameters for reading signals using the installed detector. The data obtained from the detector 312 can be transferred to the controller 291 and analyzed by controller 291.

In some embodiments, the one or more electrical terminals 320 include a ground pin configured to align with a ground terminal of the microscope plate 404. The ground pin discharges static electricity to the ground terminal during installation of the detector module 112 into the spectrometer 100. In this manner, the electrical connection between the one or more electrical terminals 320 and the spectrometer

100 are protected from static electricity. In some embodiments, the one or more electrical terminals 320 include a power pin extending from the bottom of the detector housing 301. The power pin aligns with a power terminal of the microscope plate 404. When the power pin is inserted into the power terminal, the detector module 112 receives power from the spectrometer 100. In some instances, the ground pin extends further from the bottom of the detector base plate 304 than the power pin such that static electricity is discharged before the power pin is inserted into the power terminal. In further embodiments, the one or more electrical terminals 320 include a communication pin. The communication pin aligns with a communication terminal of the microscope plate 404. In some instances, the communication pin indicates a type of the detector 312 that is within the detector housing 301. Accordingly, the controller 291 of the spectrometer 100 may receive the type of the detector 312 and adjust operating parameters for the spectrometer 100.

Figure 4:
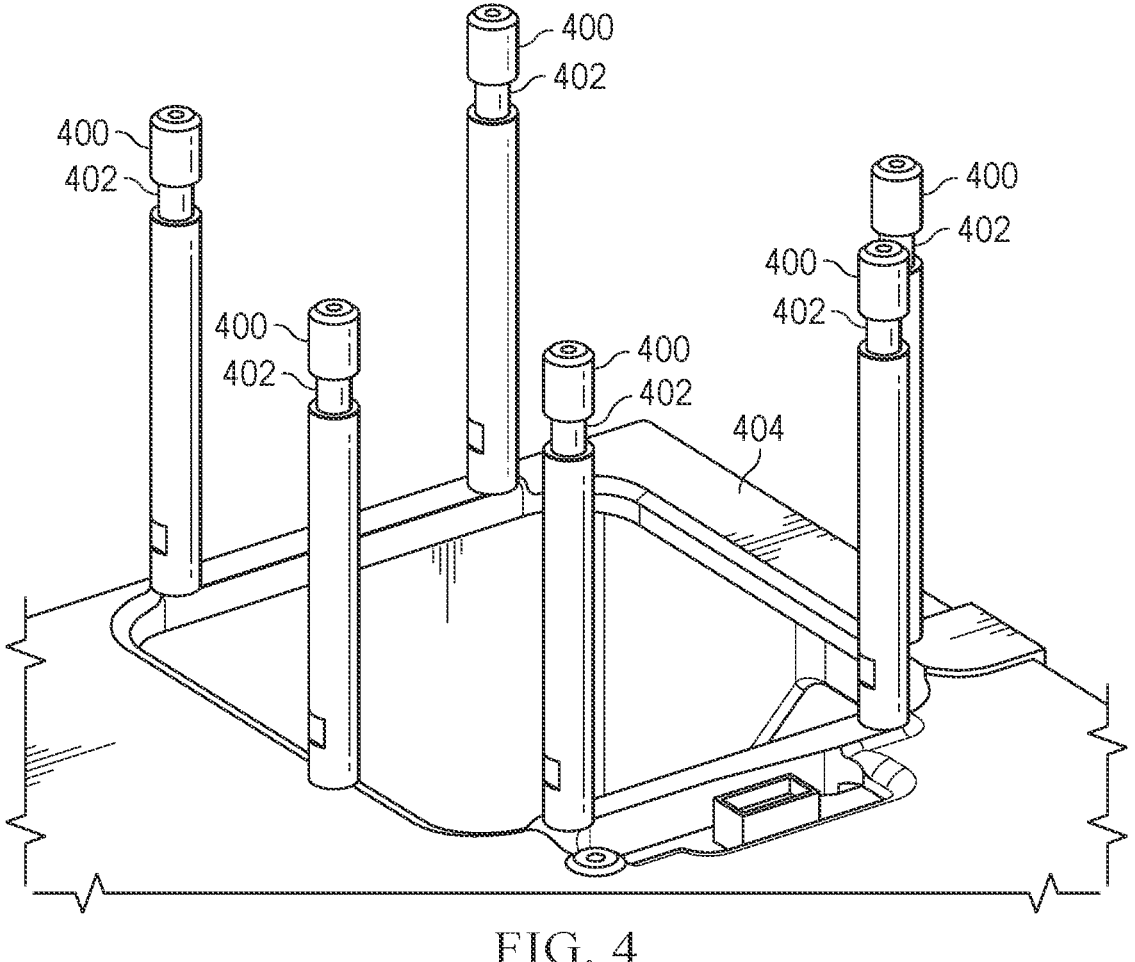
FIG. 4 depicts a plurality of posts extending from a base plate of the spectrometer of FIGS. 1A-1B in accordance with an illustrative embodiment.
Figure 5:
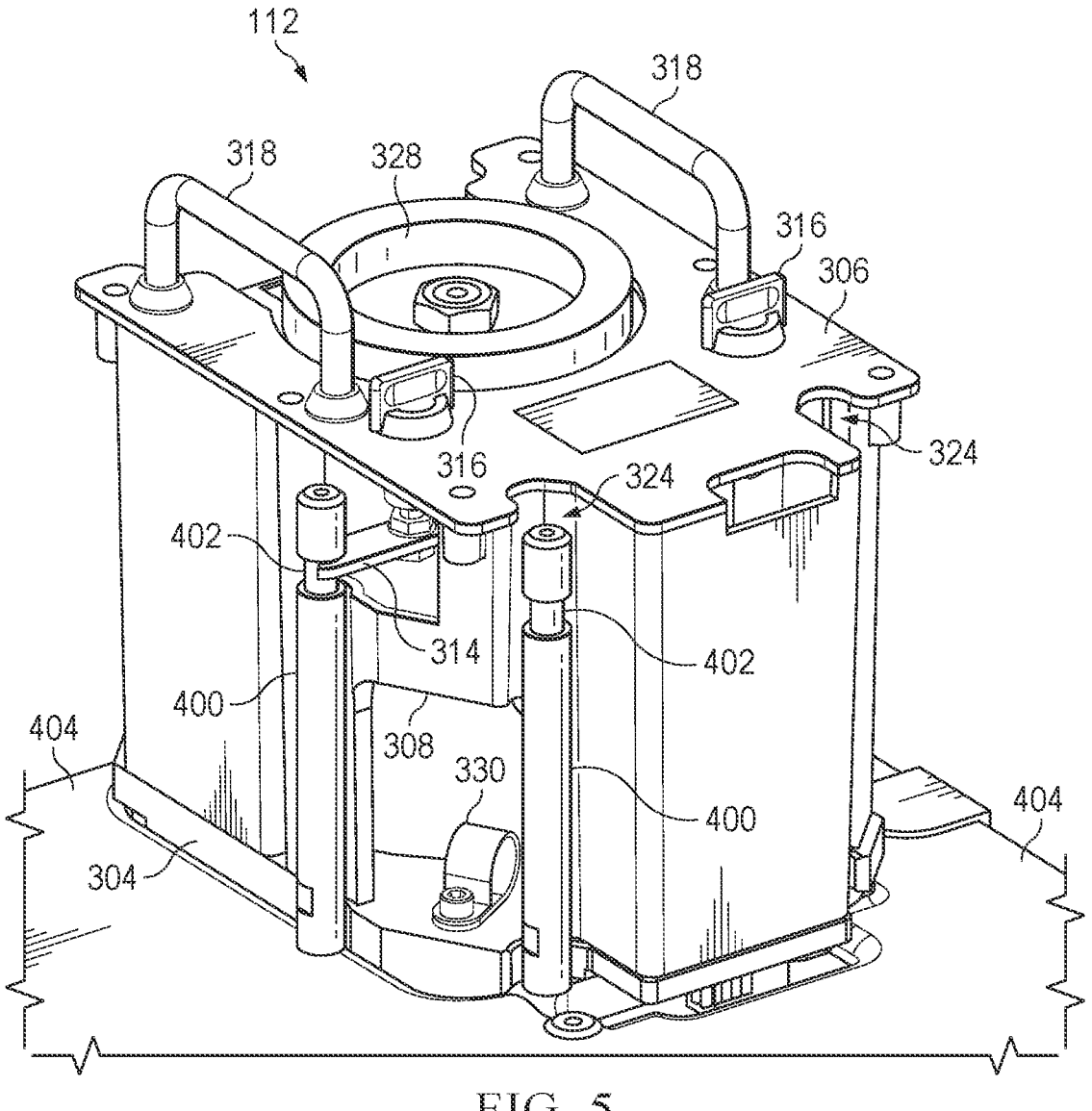
FIG. 5 depicts the detector module of FIG. 3A installed onto the base plate of FIG. 4.

As previously mentioned and shown in FIG. 4, a plurality of posts 400 extend upward and perpendicularly to the microscope plate 404 of the spectrometer 100. The plurality of posts 400 are arranged such that the plurality of posts 400 surround the detector module 112 when the detector module 112 is installed into the spectrometer 100. The plurality of posts 400 may be arranged such that the detector module 112 can only be installed in a single orientation. The posts 400 are fix-mounted to the microscope plate 404. While six posts 400 are illustrated in the example of FIG. 4, in some instances, fewer or greater number of posts 400 may be included, and the posts 400 may surround only a portion of the detector module 112 instead of surrounding the entire perimeter of the detector module 112. In some instances, only a single post 400 is included. One or more of the plurality of posts 400 may be received by the one or more recesses 324 of the detector module 112 to align the detector module 112 within the spectrometer 100. In some implementations, after the detector module 112 is placed onto the microscope plate 404, the knobs 316 are turned to rotate the one or more latches 314, which are received by a respective gap 402 in an adjacent post 400, as shown in FIG. 5. In some embodiments, the detector module 112 may include the plurality of posts 400 situated on the side wall 302 and configured to be received by recesses within the spectrometer 100.

In some instances, the detector base plate 304 further includes an alignment pin 326 (shown in FIG. 3D) extending perpendicularly downward from the detector base plate 304. When the detector module 112 is aligned within the spectrometer 100, the alignment pin 326 is received by a respective slot 602 of the microscope plate 404 (shown in FIG. 6B), providing additional support in ensuring the detector module 112 is correctly aligned. In other embodiments, the alignment pin 326 is situated on the microscope plate 404, and the respective slot 602 is situated on the detector base plate 304. Additionally, in some implementations, the detector module 112 includes multiple alignment pins 326 that are received by respective slots 602 of the microscope plate 404. The alignment pins 326 provide finer alignment (lower tolerance of alignment error) in the XY plane as compared to the posts 400. When inserting the detector module 112 into the spectrometer 100, the detector module 112 is first roughly aligned horizontally by the guidance of the posts 400, and then finely and more accurately aligned horizontally through the alignment pins 326. As such, a two-stage horizontal alignment is achieved automatically with minimal requirement to the user or operator.

In some instances, the detector module 112 includes a ring 330 fastened to the detector base plate 304 and configured to hold cabling (not shown) associated with the detector 312 and/or the detector controller 322. While illustrated as having a circular opening, the ring 330 may have openings of other shapes, such as a rectangular ring or a triangular ring. The cabling may connect the one or more electrical terminals 320 to controller terminals 332 of the detector controller 322.

In some instances, the detector module 112 includes a detector top opening 328 in the top plate 306. The detector top opening 328 may receive cooling agents (for example, liquid nitrogen) for cooling the detector 312.

Figure 6A:
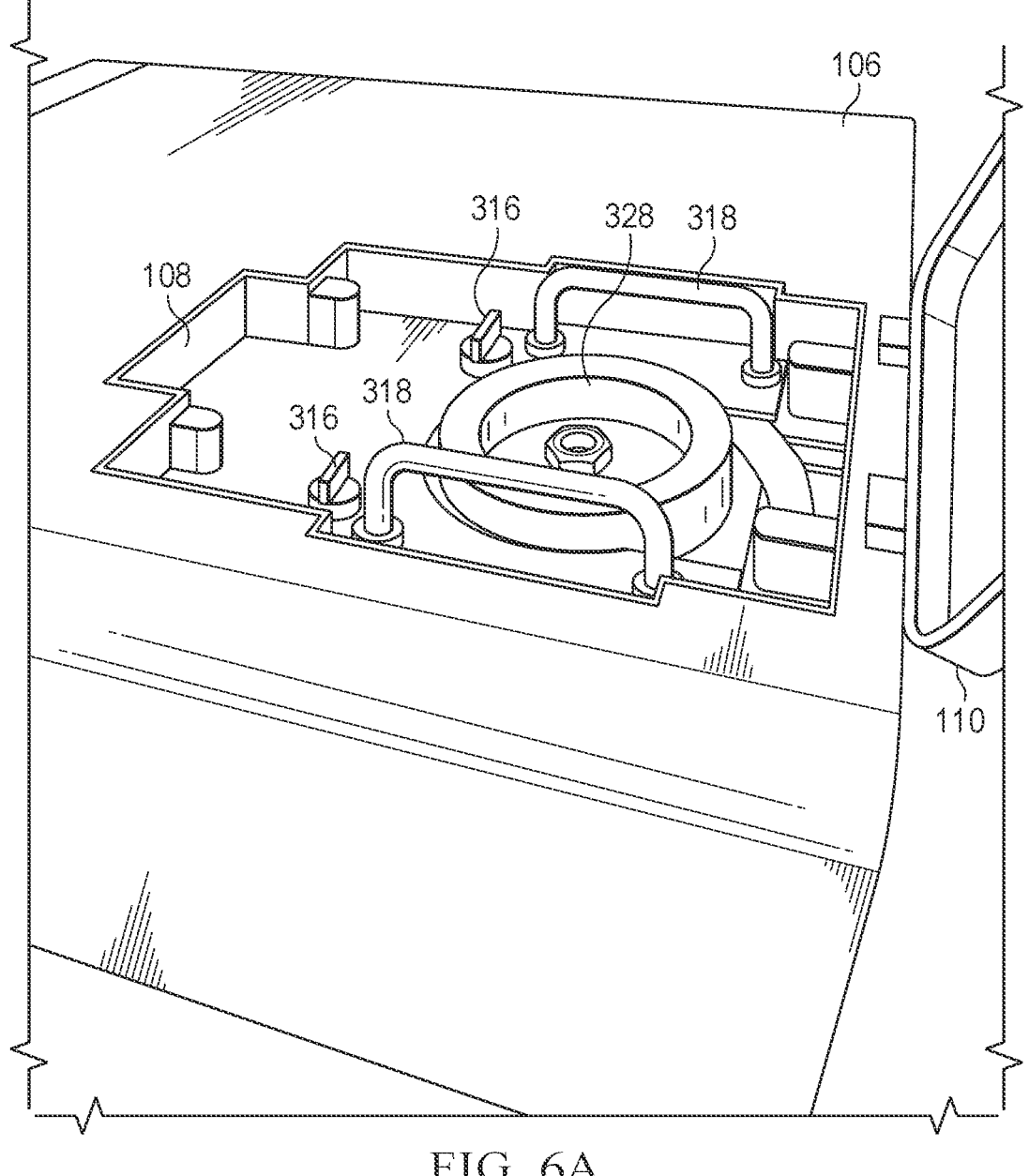
FIG. 6A depicts the detector module of FIG. 3A installed within an accessory opening in accordance with an illustrative embodiment.
Figure 6B:
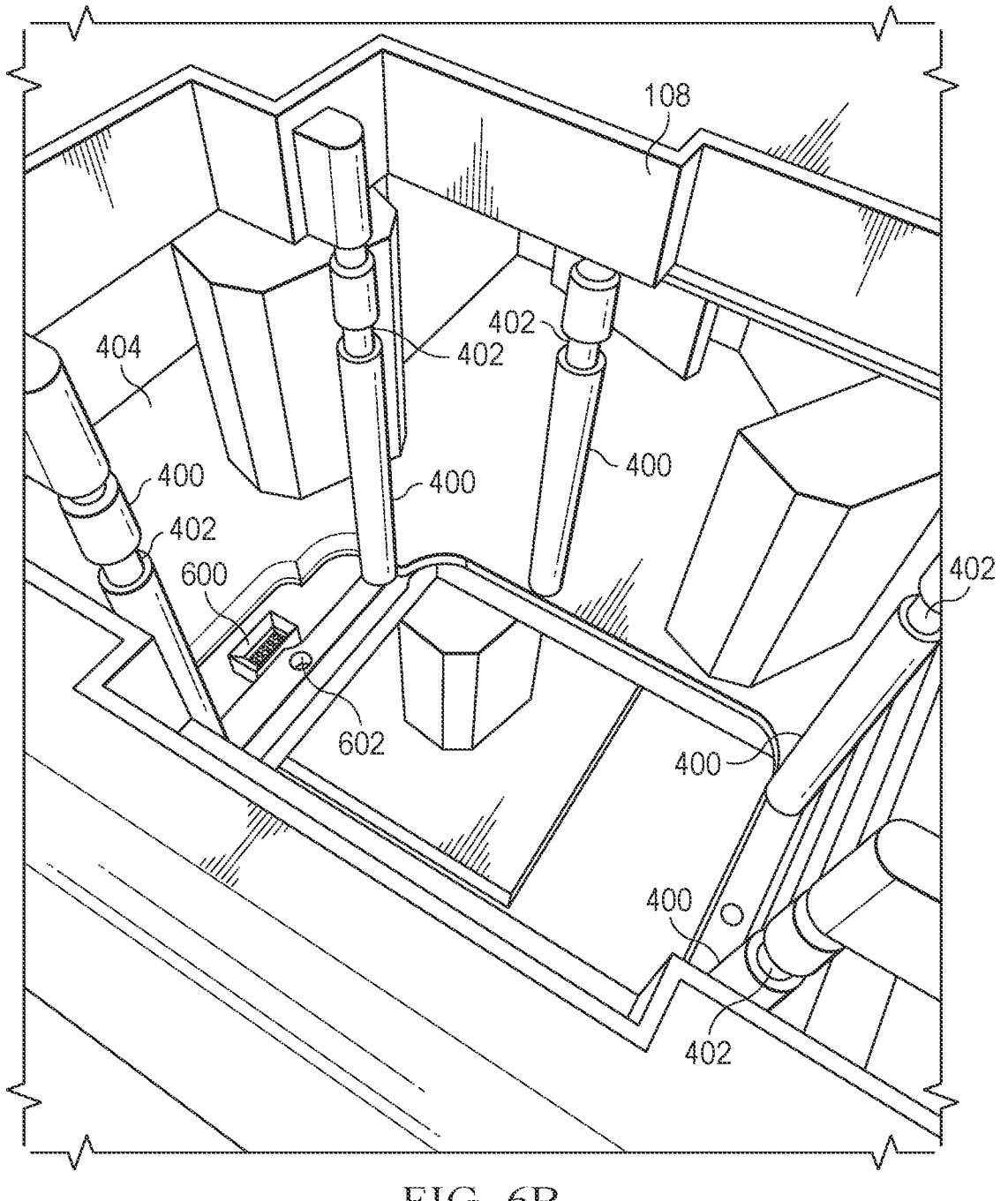
FIG. 6B depicts the accessory opening of FIG. 6A with the detector module removed in accordance with an illustrative embodiment.

As previously mentioned, the detector module 112 is installed into the spectrometer 100 via an accessory opening 108. FIGS. 6A-6B illustrate the accessory opening 108 in further detail. In FIG. 6A, the detector module 112 is situated within the accessory opening 108. A shape of the accessory opening 108 mirrors a shape of the detector housing 301 (for example, the top plate 306) to assist with aligning of the detector module 112 within the accessory opening 108. In some instances, the accessory opening 108 includes a gasket around the outer border of the accessory opening 108 such that, when the cover 110 is closed to seal the accessory opening 108, an interior of the accessory opening 108 is pressure sealed. In FIG. 6B, the detector module 112 is removed from the accessory opening 108, exposing the microscope plate 404, the plurality of posts 400, the spectrometer terminal 600 configured to receive the one or more electrical terminals 320 of the detector module 112, and the slot 602 configured to receive the alignment pin 326.

Should a user wish to use multiple detectors for the same sample or multiple detectors for multiple samples, the detector module 112 may be removed and replaced and, in some instances, may be removed and replaced while the spectrometer is operating. For example, as described above, in some instances, by extending further than the power pin, the ground pin allows the detector module 112 to be removed and replaced without creating a short or other electrical condition even if the spectrometer is currently operating/powered.

FIG. 7 provides an example method 700 for operating a microscope with multiple detector modules (for example, multiple detector accessories 112). A sample analyzed by the microscope may be changed at any point during the method 700.

At step 702, the method 700 includes mounting a first detector module to a plate of a microscope. The first detector module includes a first detector for detecting signals in the first wavelength range. For example, a first detector module 112 includes an MCT Ir detector. The cover 110 is removed (or opened) and the first detector module 112 is lowered into the accessory opening 108. The first detector module 112 is guided by the plurality of posts 400 onto the microscope plate 404. In some instances, the alignment pin 326 is received by the slot 602. Additionally, the one or more latches 314 may be operated to each engage with a respective gap 402 of an adjacent post 400.

At step 704, the method 700 includes identifying the first detector module. For example, when the first detector module 112 is installed in the spectrometer 100, the one or more electrical terminals 320 are received by the spectrometer terminal 600. The communication pin included in the one or more electrical terminals 320 allows communication between the detector controller 322 and the spectrometer controller 291. The detector controller 322 may provide an indication of the type of the detector 312 included in the first detector module 112 to the spectrometer controller 291.

At step 706, the method 700 includes selecting a light source corresponding to the first detector module. For example, when the first detector module 112 is an MCT Ir detector, an infrared light source may be selected by the spectrometer controller 291. In some instances, the spectrometer controller 291 further sets data collection parameters based on the type of the detector 312 included in the first detector module 112 (for example, a period of time to control the light source, a wavelength of the light source, and the like).

At step 708, the method 700 includes collecting data from a first sample with the first detector module. For example, light generated from analytical illumination source 230 is directed sequentially to the beam splitter 231, the objective lens 270, and the sample 251. Light from the sample 251 sequentially passes the objective lens 270, the beam splitter 256, the aperture stop 255, and to the detector 312 of the first detector module 112.

At step 710, the method 700 includes releasing the first detector module from the plate. For example, the first detector module 112 is released from the microscope plate 404 by disengaging the one or more latches 314 from the respective posts 400. The first detector module 112 is then removed from the accessory opening 108.

At step 712, the method 700 includes mounting a second detector module to the plate of the microscope. The second detector module includes a second detector for detecting a second wavelength range. For example, a second detector module 112 includes an InGaAs detector. The second detector module 112 is lowered into the accessory opening 108 and is guided by the plurality of posts 400 onto the microscope plate 404. In some instances, the alignment pin 326 of the second detector module 112 is received by the slot 602. Additionally, the one or more latches 314 may be operated to each engage with a respective gap 402 of an adjacent post 400.

At step 714, the method 700 includes identifying the second detector module 112. For example, when the second detector module 112 is installed in the spectrometer 100, the one or more electrical terminals 320 are received by the spectrometer terminal 600. The communication pin included in the one or more electrical terminals 320 allows communication between the detector controller 322 and the spectrometer controller 291. The detector controller 322 provides an indication of the type of the detector 312 included in the second detector module 112 to the spectrometer controller 291.

At step 716, the method 700 includes selecting a light source corresponding to the second detector module. For example, when the first detector module 112 is an InGaAs detector, a white light source may be selected by the spectrometer controller 291. In some instances, the spectrometer controller 291 further sets data collection parameters based on the type of the detector 312 included in the second detector module 112 (for example, a period of time to control the light source, a wavelength of the light source, and the like).

At step 718, the method 700 includes collecting data from a second sample with the second detector module. For example, light generated from the analytical illumination source 230 is directed sequentially to the beam splitter 231, the objective lens 270, and the sample 251. Light reflected back from the sample 251 sequentially passes the objective lens 270, the beam splitter 256, the aperture stop 255, and to the detector 312 of the second detector module 112. The second sample may be the same sample as the first sample analyzed using the first detector module or may be a different sample. For example, as noted above, the ground pin may allow a detector module to be removed and replaced while the spectrometer is operating/powered and, thus, makes it efficient to obtain data with two different detectors with respect to the same sample loaded in the spectrometer. In some embodiments, the second detector module is configured to detect light of a different wavelength compared to the first detector module.

In some instances, the accessory opening 108 is situated in a side of the instrument housing 102. In such an instance, the one or more posts 400 may instead extend from the side of the instrument housing 102 in a direction parallel to the microscope plate 404 to assist with installation of the detector module 112.

In some instances, the spectrometer 100 is an IR microscope or a Raman microscope. In such an instance, the optical microscope illumination source 210, the analytical illumination source 230, and/or the marker illumination source 220 may be a laser-based illumination source.

In some instances, the detector module 112 may be implemented in spectroscopic equipment having small detector elements, such as array detectors.

The following paragraphs provide various examples of the embodiments disclosed herein.

(1) A microscope system, comprising: a microscope plate; a detector module removably mounted to the microscope plate, the detector module comprising: a detector base plate; a detector fix-mounted on the detector base plate; and an optical element fix-mounted on the detector base plate, wherein the optical element is configured to receive a light and direct the light to the detector; and a plurality of posts fix-mounted to the microscope plate for aligning the detector module relative to the microscope plate.

(2) The microscope system according to (1), wherein the detector module further comprises a top plate and a latch coupled to the top plate, wherein the latch is configured to lock the detector module within the microscope.

(3) The microscope system according to (2), wherein the latch includes a cam lock.

(4) The microscope system according to any one of (2) to (3), wherein the detector module is locked within the microscope by engaging the latch with at least one post of the plurality of posts.

(5) The microscope system according to any one of (2) to (4), wherein the detector module further comprises a side wall surrounding at least a portion of the detector and the optical element, wherein the side wall extends from the detector base plate to the top plate, and wherein the side wall includes an opening for receiving the light.

(6) The microscope system according to (5), wherein the side wall includes one or more recesses configured to align the detector module with respect to the plurality of posts.

(7) The microscope system according to any one of (2) to (6), wherein the top plate includes an opening for receiving a cooling agent.

(8) The microscope system according to any one of (1) to (7), wherein the detector module further includes a handle for inserting or removing the detector module from the microscope.

(9) The microscope system according to any one of (1) to (8), wherein the microscope plate is fix-mounted to a housing of the microscope, and wherein the housing of the microscope includes an opening at the top for receiving the detector module.

(10) The microscope system according to any one of (1) to (9), further comprising a second detector module for detecting light of a different wavelengths range compared to the detector module.

(11) The microscope system according to any one of (1) to (10), wherein the light received by the optical element is a collimated light.

(12) The microscope system according to any one of (1) to (11), wherein the optical element focuses the light toward the detector.

(13) The microscope system according to any one of (1) to (12), wherein the detector base plate includes at least a pin configured to be received by a respective slot in the microscope plate.

(14) The microscope system according to any one of (1) to (13), wherein the microscope system includes a Raman microscope or an IR microscope.

(15) The microscope system according to any one of (1) to (14), wherein the detector is one selected from a group consisting of a MCT IR detector and an InGaAs detector.

(16) The microscope system according to any one of (1) to (14), wherein the posts surround the detector module when the detector module is mounted to the microscope.

(17) A swappable detector module for a microscope system, the detector module comprising: a detector housing including a top plate, a bottom plate, and a side wall extending from the bottom plate to the top plate, wherein the side wall includes an opening for light to enter the detector module; a detector fix-mounted to the bottom plate and situated within the detector housing; an optical element fix-mounted on the bottom plate and situated within the detector housing, the optical element configured to receive the light entering the detector module and direct the light to the detector; and at least one latch coupled to the top plate for locking the detector module to a microscope.

(18) The swappable detector module according to (17), wherein the side wall includes one or more recesses extending along at least a portion of a height of the side wall for guiding the detector module while inserting the detector module into a housing of a microscope.

(19) The swappable detector module according to any one of (17) to (18), wherein the latch is configured to engage with one or more posts extending from a base plate of a microscope.

(20) A method of operating a microscope with multiple detector modules according to any one of (17) to (19), comprising: mounting a first detector module to a base plate of the microscope by engaging the latch with at least one post of a plurality of posts surrounding the first detector module, wherein the posts are fix-mounted to the base plate; identifying the first detector module; collecting data from a first sample with the first detector module; releasing the first detector module from the base plate by disengaging the latch; mounting a second detector module to the base plate; identifying the second detector module; and collecting data from a second sample with the second detector module.

(21) The method according to (20), wherein the first and second samples are the same sample.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

Systems, methods, and devices in accordance with the present disclosure may take any one or more of the following configurations.

Various features and advantages of the embodiments described herein are set forth in the following claims.

What is claimed is:

1. A microscope system, comprising:
a housing, wherein the housing includes an opening;
a microscope plate fix-mounted to the housing;
a swappable detector module removably mounted to the microscope plate and configured to be inserted into and removed from the housing through the opening, the swappable detector module comprising:
a detector base plate;
a detector fix-mounted on the detector base plate; and
an optical element fix-mounted on the detector base plate, wherein the optical element is configured to receive a light and direct the light to the detector; and
a plurality of posts fix-mounted to the microscope plate for aligning the swappable detector module relative to the microscope plate.

2. The microscope system of claim 1, wherein the swappable detector module further comprises a detector top plate and a latch coupled to the top plate, wherein the latch is configured to lock the swappable detector module within the microscope.

3. The microscope system of claim 2, wherein the latch includes a cam lock.

4. The microscope system of claim 2, wherein the swappable detector module is locked within the microscope by engaging the latch with at least one post of the plurality of posts.

5. The microscope system of claim 2, wherein the swappable detector module further comprises a side wall surrounding at least a portion of the detector and the optical element, wherein the side wall extends from the detector base plate to the top plate, and wherein the side wall includes an opening for receiving the light.

6. The microscope system of claim 5, wherein the side wall includes one or more recesses configured to align the swappable detector module with respect to the plurality of posts.

7. The microscope system of claim 2, wherein the top plate includes an opening for receiving a cooling agent.

8. The microscope system of claim 1, wherein the swappable detector module further includes a handle for inserting or removing the swappable detector module from the microscope.

9. The microscope system of claim 1, wherein the opening is located at a top of the housing.

10. The microscope system of claim 1, further comprising a second swappable detector module for detecting light of a different wavelengths range compared to the swappable detector module.

11. The microscope system of claim 1, wherein the light received by the optical element is a collimated light.

12. The microscope system of claim 1, wherein the optical element focuses the light toward the detector.

13. The microscope system of claim 1, wherein the detector base plate includes at least a pin configured to be received by a respective slot in the microscope plate.

14. The microscope system of claim 1, wherein the microscope system includes a Raman microscope or an IR microscope.

15. The microscope system of claim 1, wherein the detector is one selected from a group consisting of a MCT IR detector and an InGaAs detector.

16. The microscope system of claim 1, wherein the posts surround the swappable detector module when the swappable detector module is mounted to the microscope.

17. A swappable detector module for a microscope system having a microscope housing with an opening at the top and a microscope plate fix-mounted within the microscope housing, the swappable detector module comprising:
a detector housing including a top plate, a bottom plate, and side wall extending from the bottom plate to the top plate, wherein the side wall includes an opening for light to enter the swappable detector module;
a detector fix-mounted to the bottom plate and situated within the detector housing;
an optical element fix-mounted on the bottom plate and situated within the detector housing, the optical element configured to receive the light entering the swappable detector module and direct the light to the detector; and
at least one latch coupled to the top plate for locking the swappable detector module to the microscope plate,
wherein the swappable detector module is configured to be inserted and removed from the microscope system from the opening of the microscope housing.

18. The swappable detector module of claim 17, wherein the side wall includes one or more recesses extending along at least a portion of a height of the side wall for guiding the swappable detector module while inserting the swappable detector module into a housing of a microscope.

19. The swappable detector module of claim 17, wherein the latch is configured to engage with one or more posts extending from the microscope plate.

20. A method of operating a microscope with multiple swappable detector modules of claim 17, comprising:
mounting a first swappable detector module to the microscope plate by engaging the latch with at least one post of a plurality of posts fix-mounted to the microscope plate;
identifying the first swappable detector module;
collecting data from a first sample with the first swappable detector module;
releasing the first swappable detector module from the microscope plate by disengaging the latch and removing the swappable detector module from the opening at the top of the microscope housing;
mounting a second swappable detector module to the microscope plate;
identifying the second swappable detector module by lowering the second swappable detector module into the opening at the top of the microscope housing; and
collecting data from a second sample with the second swappable detector module.

21. The method of claim 20, wherein the first and second samples are the same sample.

* * * * *